Aug. 23, 1927. 1,639,644

K. BAUMANN

FLEXIBLE COUPLING FOR SHAFTS

Filed March 4, 1922

WITNESSES:
R. B. Wakefield
Lewis A. Wright

Karl Baumann
INVENTOR

BY D. C. Davis
ATTORNEY

Patented Aug. 23, 1927.

1,639,644

UNITED STATES PATENT OFFICE.

KARL BAUMANN, OF URMSTON, ENGLAND, ASSIGNOR TO WESTINGHOUSE ELECTRIC AND MANUFACTURING COMPANY, A CORPORATION OF PENNSYLVANIA.

FLEXIBLE COUPLING FOR SHAFTS.

Application filed March 4, 1922, Serial No. 540,963, and in Great Britain March 24, 1921.

This invention relates to flexible couplings for shafts and has for its object to construct an improved coupling which is adapted to transmit considerable amounts of power and which shall possess a certain amount of transverse flexibility and at the same time be capable of transmitting a thrust from one of the coupled shafts to the other.

When two shafts to be coupled are out of alignment so that their axes make an angle with each other, the coupling must possess transverse flexibility. Usually, however, flexible couplings having this property will not permit a thrust to be transmitted from one of the coupled shafts to the other.

According to the present invention the improved coupling is formed of one or more sleeves provided with flanges which are connected with relatively rigid flanges provided on the ends of the shafts to be coupled and in addition the shafts are firmly connected together by a single bolt through which a thrust can be transmitted. When the two or more sleeves are employed, the flanges of adjacent sleeves will be connected together to form the coupling.

Figure 1:
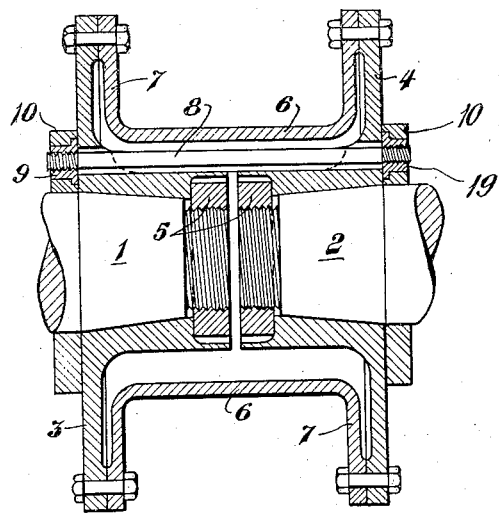
Figure 2:
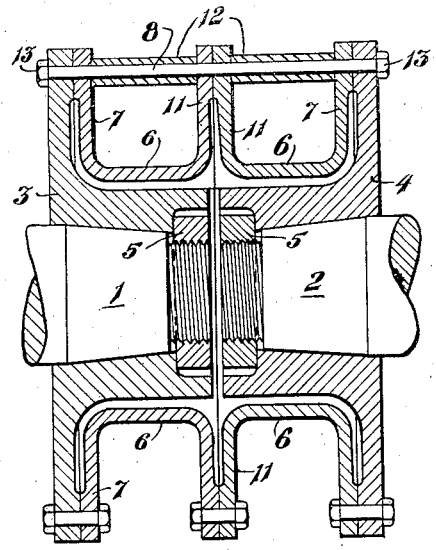
Figure 3:
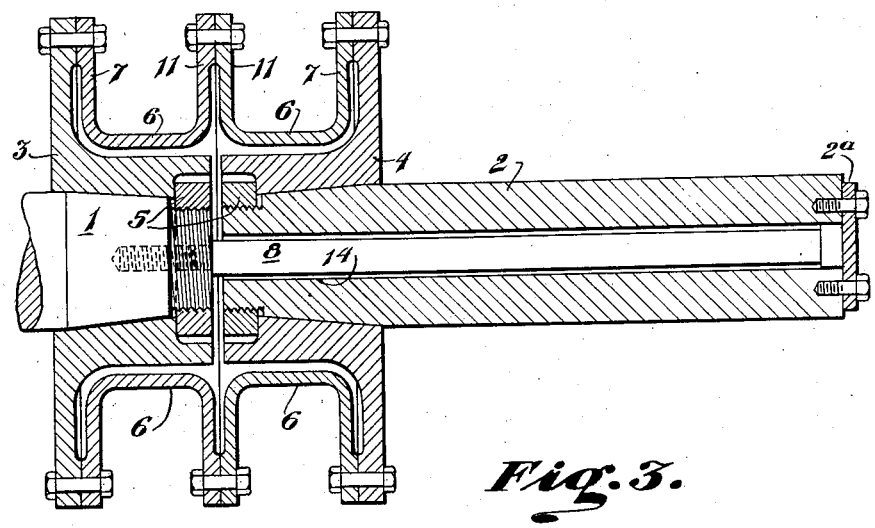

To enable the invention to be clearly understood it will now be described with reference to the accompanying drawings in which Fig. 1 is a longitudinal section of one form of the coupling in accordance with the invention, and Figs. 2 and 3 are similar views of modifications.

Referring to Fig. 1 of the drawings, 1 and 2 are the shafts which are to be coupled together, 3 and 4 are rigid flange members secured for example by nuts 5 to conical ends of said shafts and 6 is a coupling member comprising a cylinder formed with flanges 7 at each end, the said flanges being connected at their outer peripheries to the outer peripheries of the members 3 and 4 and constituting the resilient or flexible diaphragm elements of the coupling. To enable a flexible or resilient coupling as above described to transmit thrust, the rigid members 3 and 4 are connected by a single bolt 8 the ends of which are secured to the said members 3 and 4 in any suitable manner, for example, by means of flange nuts 9 engaging in plates 10 secured by means of screws or otherwise to the outer end faces of the members 3 and 4. The said bolt 8 is preferably arranged as near to the axis of the shafts 1 and 2 as possible, and as shown in Fig. 1 it is arranged within the cylindrical portion of the coupling member 6.

Referring to Fig. 2 the coupling member 6 consists of two cylindrical portions each having at the ends flanges 7 and 11, the flanges 7 being connected as before to the members 3 and 4 whilst the flanges 11 are bolted together around their outer peripheries. The bolt 8 is connected between the peripheries of the members 3 and 4 and as shown passes through the flanges 11. Sleeves 12 are provided on the bolt 8 between the flanges 7 and 11 for transmitting the thrust, the ends of the bolt 8 being provided with nuts 13 as shown for securing it in position. Whilst the bolt 8 is shown as passing through the flanges 11 it will be understood that this is not essential as the latter may be of smaller diameter than the members 3 and 4.

With either of the above arrangements it will be observed that the torque is transmitted from one shaft to the other through the resilient diaphragm elements and the tubular portions and not through the bolt, whilst the thrust is transmitted through the bolt almost entirely, the latter being sufficiently flexible transversely to conform to the relative movements between the shafts permitted by the diaphragm elements.

Instead of the bolt 8 being connected between the coupling members 3 and 4 it may be screwed into or otherwise rigidly attached to the centre of the end of one of the shafts and pass through an axial bore 14 in the other shaft to the remote end 2ª of which latter it is rigidly connected as shown in Fig. 3, thus constituting what is commonly known as a quill drive. As in the previously described arrangements, the torque is transmitted through and the transverse or angular flexibility is permitted by the resilient diaphragm elements whilst the thrust is transmitted entirely or almost entirely by the bolt 8, the bore 14 through which the latter passes being of sufficient diameter to permit the required amount of transverse flexing of the bolt corresponding to the relative transverse or angular movement between the two shafts.

It will be understood that the coupling above described may be modified in various constructional details without departing from the scope of the invention.

Having now particularly described and ascertained the nature of my said invention and in what manner the same is to be performed, I declare that what I claim is:

1. In a flexible coupling for shafts having ends disposed in proximate relation, the combination of coupling heads rigidly secured to each of the shafts, said coupling heads having extending flange portions remotely disposed from the shaft ends, a flexible torque-transmitting means connecting said extending flange portions, and means, including a bolt associated with the heads for transmitting thrust between them.

2. In a flexible coupling for shafts, the combination of coupling heads secured to each of the shafts, a flexible torque-transmitting member arranged concentrically without the coupling heads and connecting the same, a bolt connecting the heads, and a sleeve member surrounding the bolt and disposed between the coupling heads to transmit thrust between them.

3. In a flexible coupling for shafts, the combination of coupling heads rigidly secured to the shaft, said coupling heads having radially-extending flange portions remotely disposed from the shaft ends, a tubular torque-transmitting member arranged concentrically without the coupling heads and connecting the radially-extending flange portions, said tubular torque-transmitting member having a resilient portion, a tie member connecting the heads, and a spacing member surrounding the tie member between the coupling heads to transmit thrust between them.

4. A coupling for shafts comprising coupling heads having projecting flanges rigidly secured to the shaft, flexible members connecting the heads in torque-transmitting relation, including flexible, projecting flanges adapted to be secured to the coupling head flanges and a tubular, non-resilient portion between them, and means including a bolt connecting the heads and passing through the flexible flanges and a sleeve surrounding the bolt between the flanges for transmitting thrust between the heads.

5. In a flexible coupling for shafts, the combination of coupling heads rigidly secured to each of the shafts, said coupling heads having extending flange portions, a flexible U-shaped annular torque-transmitting member interposed between the extending flange portions and surrounding the coupling heads, means for securing the respective ends of the torque-transmitting member to the extending flange portions, and a flexible bolt connecting the coupling heads.

6. In a flexible coupling for connecting in driving relation a pair of shafts, coupling heads rigidly secured to each of the shafts, said coupling heads having extending flange portions remotely disposed from the shaft ends, tubular torque-transmitting members, each of said tubular torque transmitting members being provided with resilient projecting flanges and a non-resilient portion, means connecting one flange of each torque-transmitting member to the extending flange portion of one of the coupling heads, means connecting the other flanges of the torque-transmitting members together, and a flexible thrust member disposed eccentrically of the shafts for connecting the coupling heads.

7. In a flexible coupling for connecting in driving relation a pair of shafts, coupling heads rigidly secured to each of the shafts, tubular, torque-transmitting members each provided with flexible, projecting flanges and a non-resilient portion surrounding the coupling heads, means connecting the outer periphery of one flange of each torque transmitting member to one of the heads, means connecting the outer peripheries of the other flanges of the torque-transmitting members together, means including a bolt connecting the coupling heads and passing through the projecting flanges of the tubular torque-transmitting members, and a sleeve surrounding the bolt between the flanges for transmitting thrust between the coupling heads.

8. In a flexible coupling for shafts, the combination of coupling heads rigidly secured to the shaft, a flexible torque transmitting member connecting the coupling heads, and a laterally flexible member rigidly connecting the coupling heads without the shaft sections for transmitting thrust therebetween.

In testimony whereof, I have hereunto subscribed my name this third day of February, 1922.

KARL BAUMANN.